United States Patent [19]
Paddock

[11] 3,774,746
[45] Nov. 27, 1973

[54] CONVEYOR WITH ROCKING UNITS TO ROLL ROUND ARTICLES

[75] Inventor: Paul F. Paddock, Riverside, Calif.

[73] Assignee: Sunkist Growers, Inc., Sherman Oaks, Calif.

[22] Filed: Apr. 8, 1971

[21] Appl. No.: 132,444

[52] U.S. Cl. .................................. 198/30, 198/218
[51] Int. Cl. ............................................ B65g 47/26
[58] Field of Search ..................... 198/218, 30, 219; 134/78; 209/73

[56] References Cited
UNITED STATES PATENTS

| | | | |
|---|---|---|---|
| 1,753,679 | 4/1930 | Barrett | 198/219 X |
| 614,529 | 11/1898 | Bonta | 198/218 X |
| 943,373 | 12/1909 | Barbour | 198/219 |
| 3,080,044 | 3/1963 | Morgan | 198/219 X |
| 1,992,331 | 2/1935 | Smith | 198/219 |
| 3,523,604 | 8/1970 | Babunovic et al. | 198/32 X |
| 3,343,655 | 9/1967 | Howard | 198/218 |
| 2,484,222 | 10/1949 | Hauswald | 198/30 |
| 2,598,905 | 6/1952 | Gill | 198/30 |

FOREIGN PATENTS OR APPLICATIONS 2,007,157  9/1970  Germany ........................ 198/219

Primary Examiner—Evon C. Blunk
Assistant Examiner—Douglas D. Watts
Attorney—Paul A. Weilein

[57] ABSTRACT

Round articles are rolled in stages by a series of conveyor units arranged edge to edge that rock about axes perpendicular to the direction of travel. The conveyor units are rocked synchronously between rearward and forward positions and the conveyor units are formed with seats adjacent their back edges to receive new articles on each cycle.

A given round article that rolls onto the seat of a conveyor unit when the unit is in its rearward position rolls forward on the unit as the unit rocks to its forward position. Then as the unit rocks back to its rearward article-receiving position, the given article is boosted onto the seat of the next forward conveyor unit. Thus, normally all of the articles on the conveyor advance by one conveyor unit on each cycle.

40 Claims, 16 Drawing Figures

PATENTED NOV 27 1973

INVENTOR
PAUL F. PADDOCK
BY
Paul A. Weilein
ATTORNEY

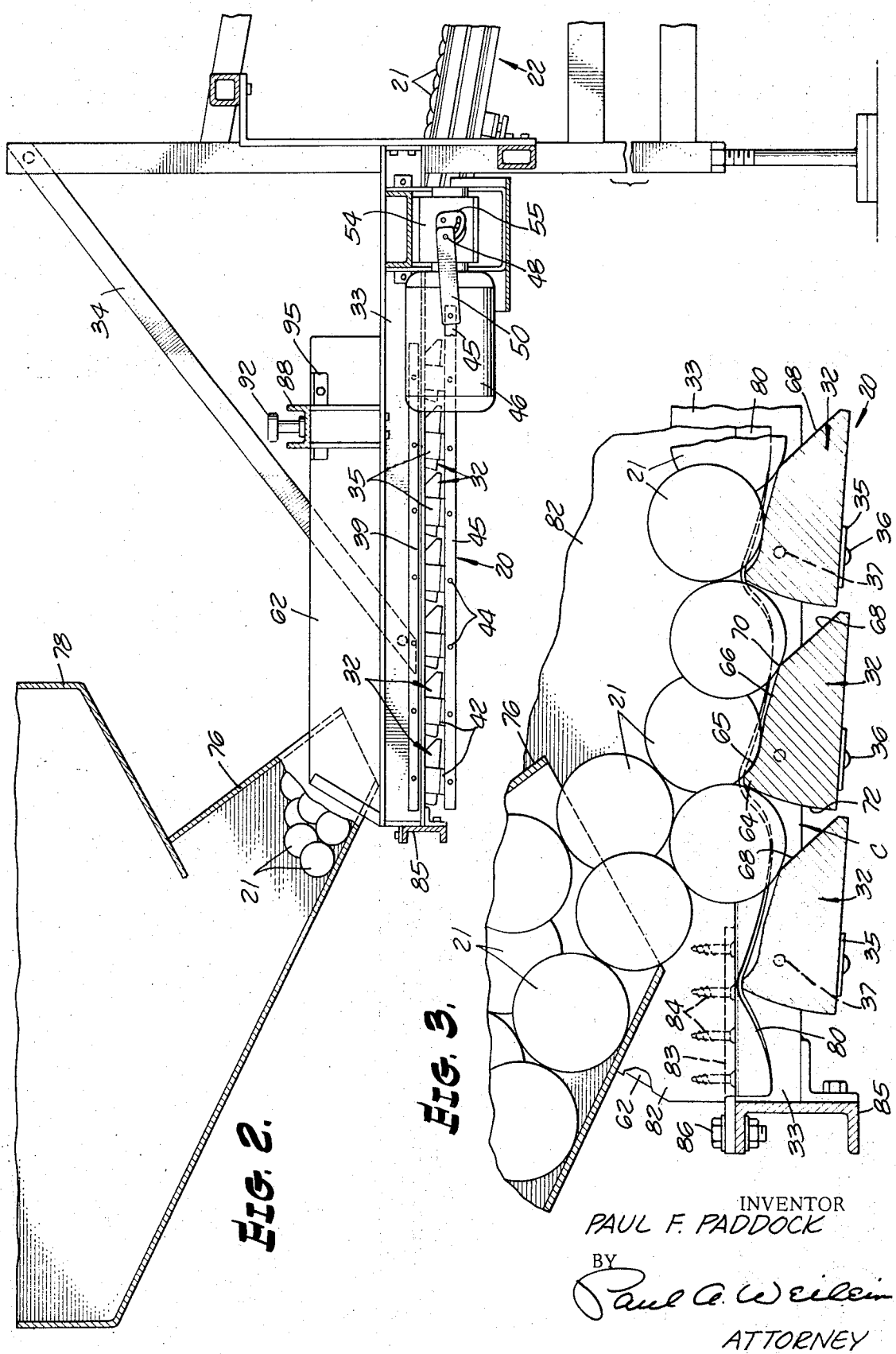

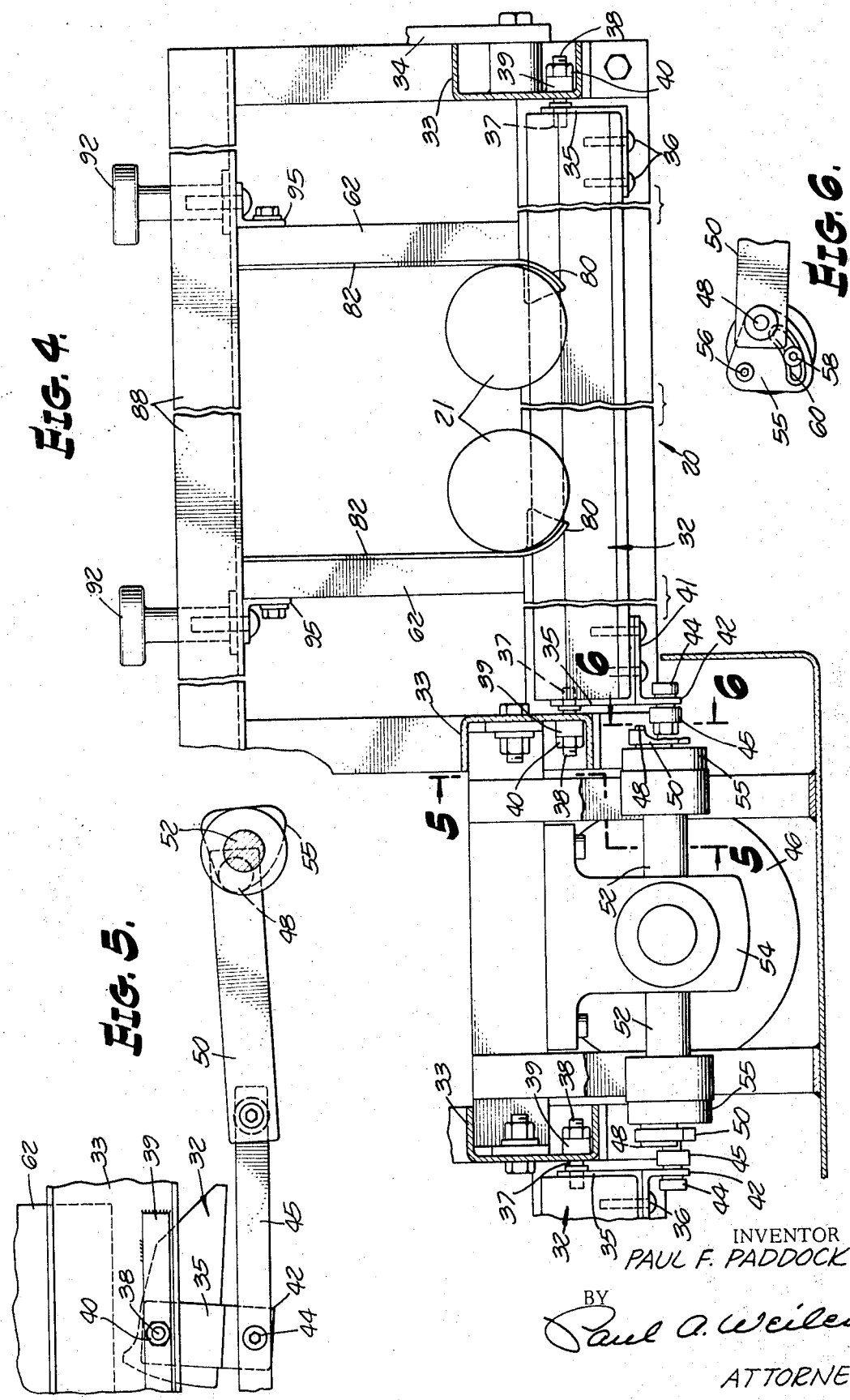

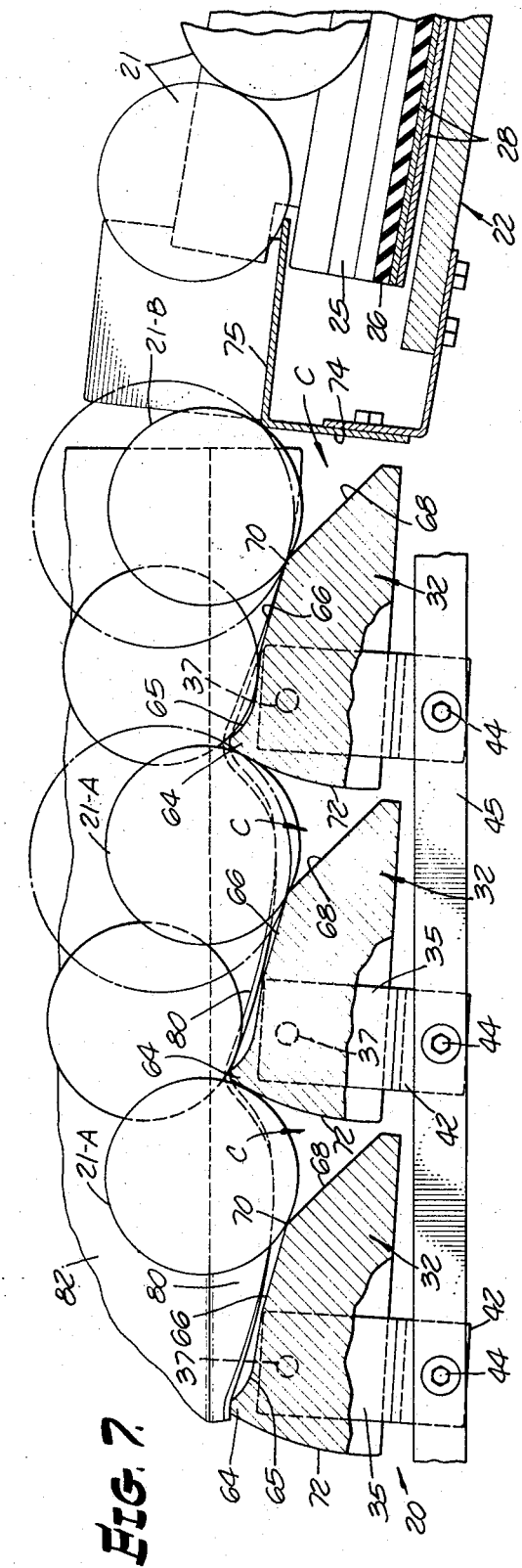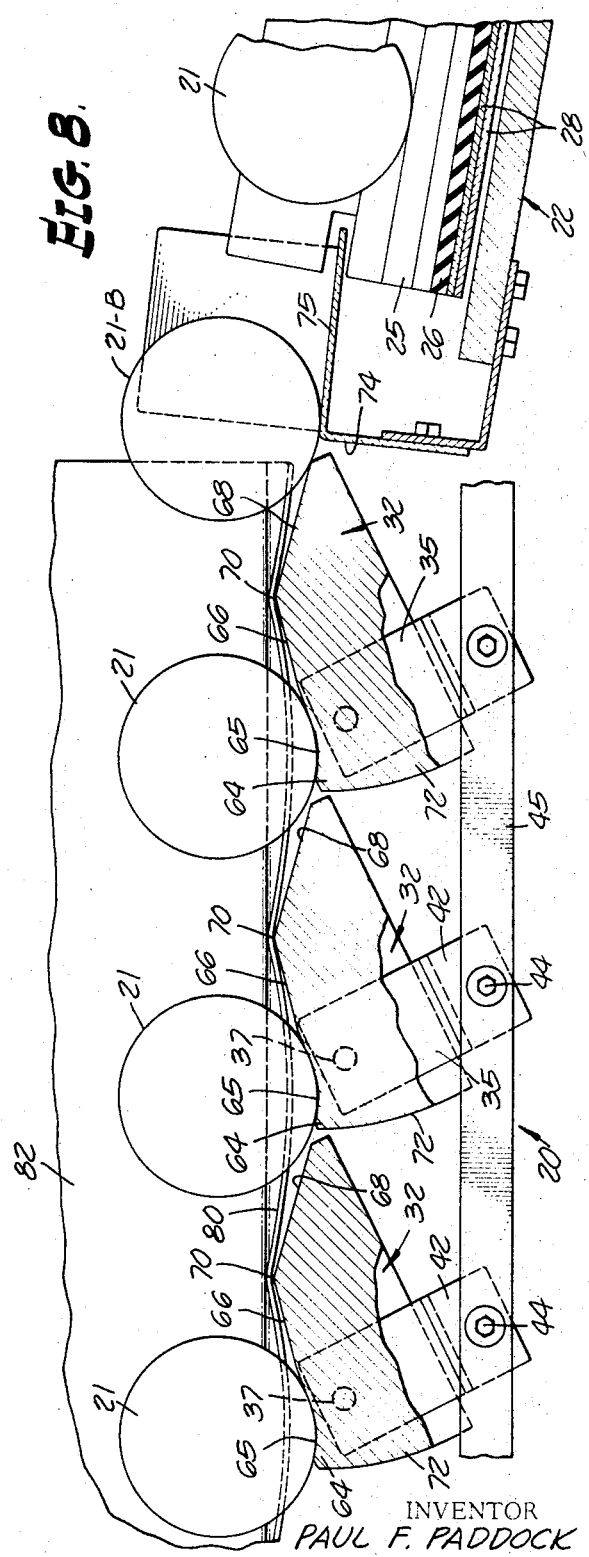

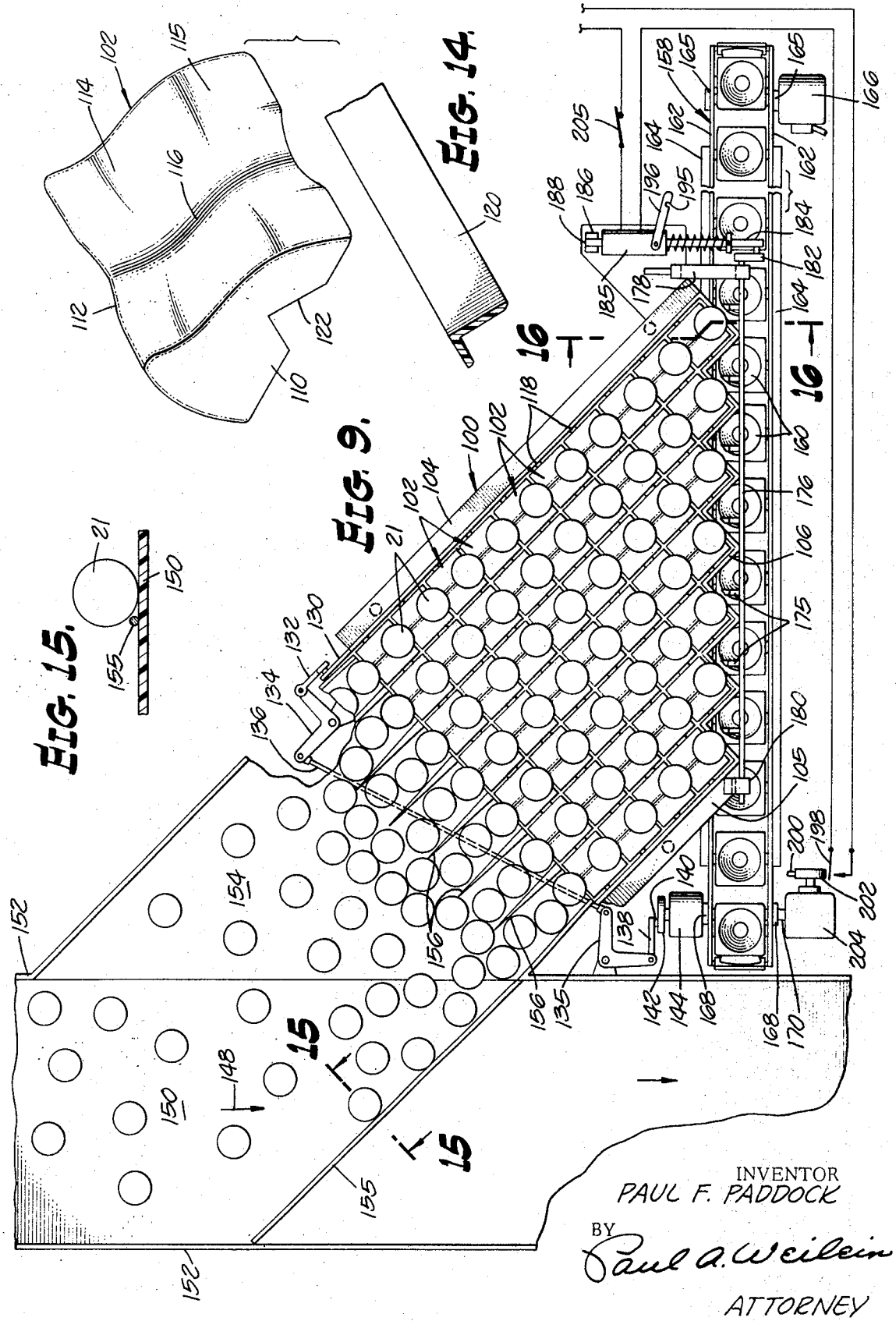

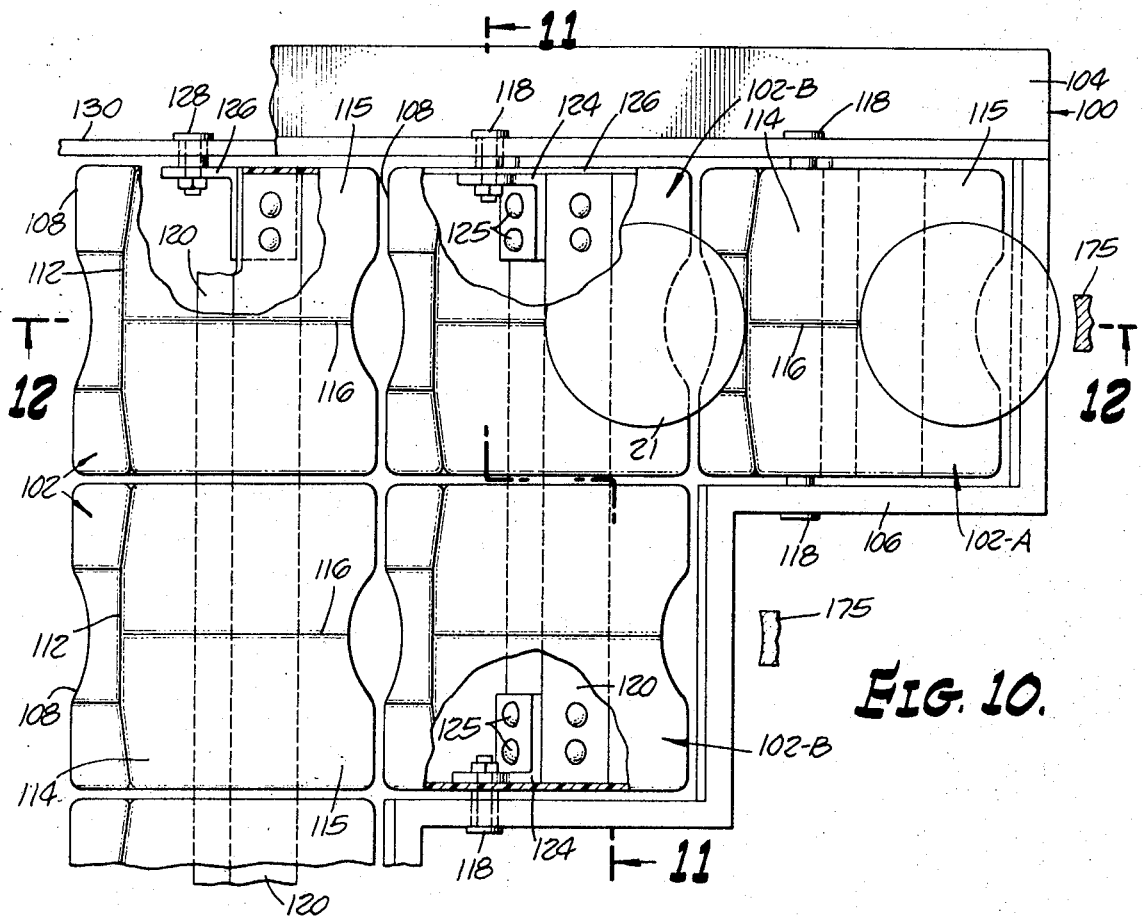
FIG. 10.
FIG. 11.
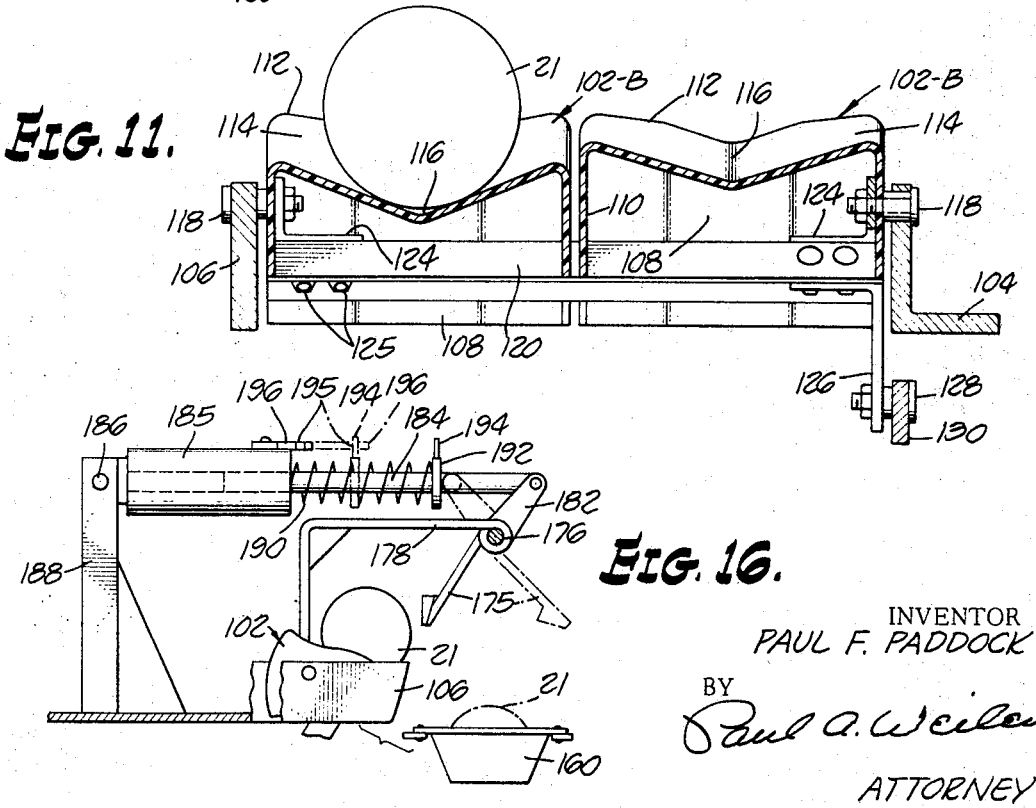
FIG. 16.
INVENTOR
PAUL F. PADDOCK
BY
Paul A. Weilein
ATTORNEY

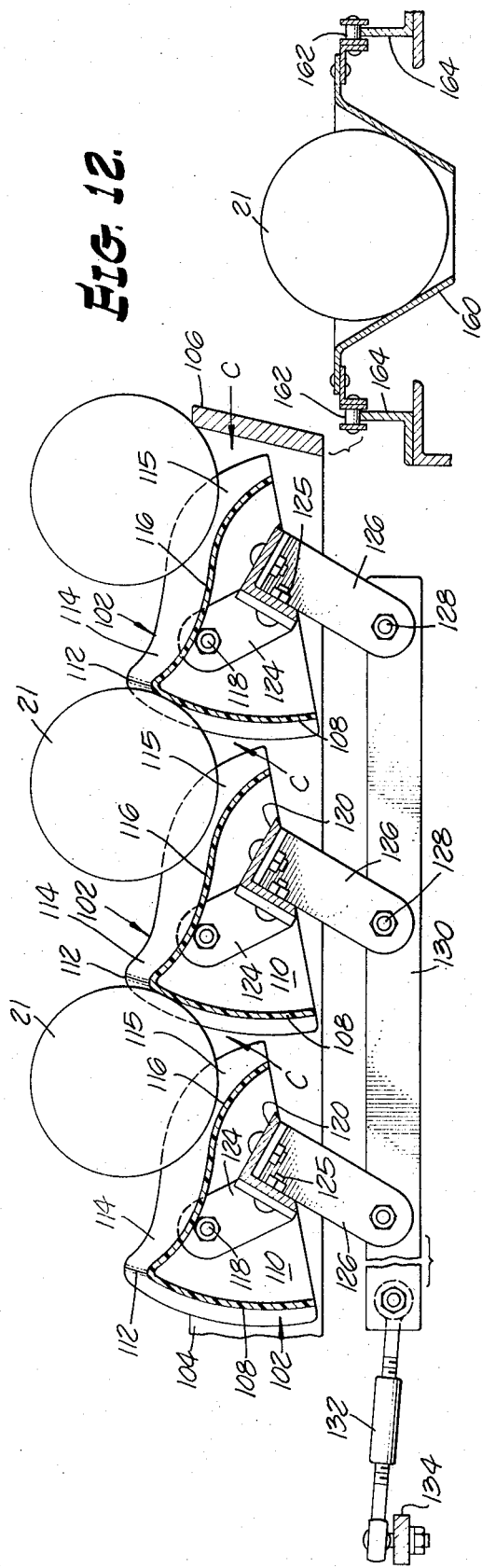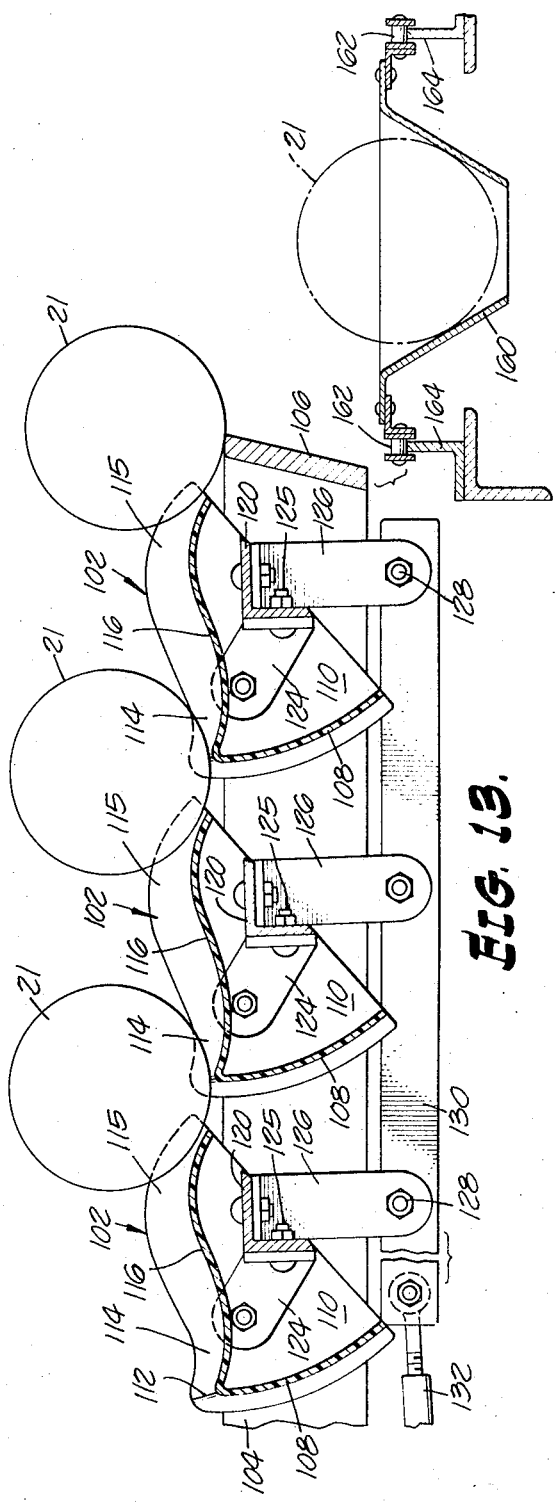

CONVEYOR WITH ROCKING UNITS TO ROLL ROUND ARTICLES

BACKGROUND OF THE INVENTION

This invention relates to conveyors of the type that move round articles, such as fruit, step by step by rolling action. Conveyors of this general character are disclosed in the following patents: Cutler U.S. Pat. No. 1,942,538; Stebler U.S. Pat. No. 1,970,107; and Smith U.S. Pat. No. 1,992,331.

In the Cutler disclosure a plurality of fixed longitudinal bars formed with an upper edge of undulating configuration serve in pairs to form several longitudinal series of seats for round articles and alternate bars also of undulating configuration reciprocate in unison to advance the articles from seat to seat.

In the Stebler and Smith disclosures a series of fixed transverse bars cooperate with a series of alternate movable transverse bars to form a longitudinal series of seats for round articles and the alternate movable bars reciprocate up and down in unison to advance the articles from seat to seat.

One disadvantage of these prior art disclosures is that the dimension of each seat in the direction of travel is relatively small, being comparable to the diameter of one of the round articles so that a series of a relatively large number of seats is required to span even a moderate distance. Thus, the round articles must bob up and down an excessive number of times before reaching the discharge end of the conveyor.

A related disadvantage is that on each advance of an article when it is lifted to a crest between successive fixed seats, the article rolls down from the crest to the bottom of the next seat with increasing velocity and then the article is abruptly stopped at the bottom of the seat by impact force. The numerous impacts necessary to cover even a short distance is damaging and especially to relatively soft articles such as peaches.

Another disadvantage of the Cutler and Stebler conveyors is that the conveyor structure is relatively expensive because a large number of the alternate stationary and reciprocating transverse bars is required per unit length of the conveyor.

It is apparent that a need exists for a conveyor of this general type that is gentle in its action on the round articles and it is further desirable to provide such a conveyor that is of simple construction with relatively few moving parts.

SUMMARY OF THE INVENTION

A longitudinal series of conveyor units are arranged edge to edge to form a segmental surface along which the round articles may roll by stages. Each conveyor unit has a transverse ridge adjacent its rear edge to form a seat to receive the successive articles and to keep the successive articles from rolling backward off the rear edge of the unit and all of the units are rocked in unison between rearward and forward positions to cause the round articles to advance step by step from unit to unit.

Typically, a given article advances onto the rearward seat of a conveyor unit when the conveyor unit is rocked to its rearward position and then the given article rolls forward across the unit as the unit rocks to its forward position. Finally, as the unit rocks back to its rearward position the advanced given article is boosted onto the seat of the next forward conveyor unit. Thus, typically, each time all of the units rock rearwardly, the articles on the units advance by one conveyor unit.

Under this basic concept, the conveyor may take different forms and may have different specific objects in different practices of the invention.

One object common to the two embodiments of the invention disclosed herein is to minimize the fluctuations in level of the travelling articles. In the above mentioned prior art disclosures the articles repeatedly roll over fixed crests into valleys that alternate with the crests so that each round article repeatedly alternates between the level of the crests and the level of the bottoms of the valleys. In the present invention the conveyor does cyclically form a series of crests and valleys, but this configuration is momentary and misleading because as a round article starts to roll down a slope towards the bottom of a valley, the slope is progressively swung upward with the result that the net drop in level of the article is only enough to cause the article to gravitate forward at moderate velocity and the moderately moving article is brought to a temporary stop at the forward edge of the conveyor unit in a gentle manner.

In this regard, a feature of the preferred practices of the invention is that the forward portion of the surface of each conveyor unit slopes downwardly at an angle relative to the rearward portion of the surface. Thus, the surface of a conveyor unit is divided into two successive portions with the seat of the conveyor at the rear portion and with a crest at the juncture of the two portions. The surface of the conveyor unit may be so shaped and dimensioned and the timing of the rocking motion of the conveyor unit may be such that during the later part of the time interval in which an article is rolling forward from the seat of the unit, the unit is rocking rearwardly to progressively swing upward the downwardly sloping surfaces of the unit. Before the rearward portion of the surface approaches a horizontal position the article crosses the crest to the forward portion of the surface which is also swinging upwardly.

Another object of the two embodiments of the invention is to provide a relatively simple conveyor structure with few parts in comparison with the above mentioned prior art conveyors. The new construction is less costly than the prior art conveyors and much easier to maintain and repair.

Another object of both embodiments of the invention is to promote the forward progress of the round articles with minimum damage to the articles by combining forward bodily translation of the articles by the rocking conveyor units with forward rolling travel of the articles on the surfaces of the rocking units, the two kinds of forward motion alternating cyclically. Thus, as a conveyor unit rocks forward from its rearward position with a round article on the rearward seat of the unit, the seat moves forward in an arc to carry the article bodily forward and to give the article forward momentum before the article starts to roll forward on the unit.

The forward component of the arc of travel of the seat relative to the vertical component is determined in part by the location of the axis about which the conveyor seat rotates, i.e., by the radial distance to the seat from the rocking axis and is determined in further part by the location of the arc on a circle defined by the radial distance. In the preferred practice of the invention, the axis of rotation of a conveyor unit is spaced substantially below the upper surface of the unit and the arc through which the seat of the conveyor unit reciprocates is near the upper side of the circle defined by the radial distance to the seat, the result being that the horizontal forward component of the arcuate movement of the seat is large relative to the vertical component.

A further object of the invention is to minimize the damage to relatively fragile round articles that is incurred by repeated impacts in the step-by-step progress of the articles. In each of the above mentioned prior art disclosures an article is repeatedly accelerated by impact force over a crest between two successive seats of the conveyor. In contrast, the present invention accelerates a seat in which the article rests and thus accelerates an article without employing impact force against the article itself. The invention protects the fruit not only by using an arcuately travelling seat to initiate a forward increment of travel of the fruit, but also by progressively lessening the slope on which the fruit rolls as the fruit approaches a stop at the end of an increment of travel.

As will be explained, a feature of the invention of primary importance is that the forward progress of articles is characterized by individual behavior of the articles rather than mass behavior. In fact, there is normally substantially no forward pressure of article against article in the mass of articles that are on the conveyor at any given moment. Even more striking is the fact that blocking the discharge of articles from the end of the conveyor with the conveyor continuing to operate does not result in rising cumulative pressure among the articles. Instead, overall conveyance of the articles stops, and the articles merely reciprocate on the rocking conveyor units, the only advance from unit to unit being the automatic advance of articles to occupy any vacancies that may exist on the conveyor units.

The described behavior of the articles in transit may be utilized in a number of different ways in different practices of the invention. In one example, a mass of round articles of a depth of two layers is crowded onto the input end of a series of conveyor units in which each conveyor unit has a width that is several times the diameter of the round articles. The mass of articles is attenuated and reduced to a single layer by the first several relatively wide conveyor units and by the time the last relatively wide conveyor unit is reached, the progress of the articles is under complete control.

If the discharge of the articles from the relatively wide end of the conveyor is not blocked, substantially the same number of articles is discharged on each operating cycle of the series of units. Thus, the series of conveyor units functions to meter the articles taken from the supply mass and if there is a given demand to be satisfied at the discharge end of the conveyor, that demand may be met simply by cycling the conveyor units at a sufficiently high frequency.

In some situations the demand varies across the width of the last relatively wide conveyor unit. For example, in packing fruit into boxes it is common practice to arrange the fruit in parallel rows in parallel supply channels at a supply station and to periodically remove a rectangular pattern of the fruit from the rows, the rectangular pattern usually being oriented diagonally of the rows. For example, a diagonally oriented rectangular pattern of fruit that is to form a layer in a box may comprise one fruit from each row of the two outer supply channels at the supply station, three fruit from the rows next adjacent supply channels, and five fruit from the four remaining supply channels. To continuously replenish such an assembly of eight supply channels, a conveyor comprising a series of cylically rocking conveyor units may be used with the conveyor wide enough to register with the eight supply channels. If a diagonal pattern of fruit is removed from the supply channels in a given unit of time with a maximum of four articles removed from any one channel and the conveyor cycles more than four times in a given unit of time, each of the eight channels is replenished automatically in accord with its individual demand. There is no damaging crowding of fruit on the series of rocker units even if the conveyor continues to cycle indefinitely with none of the supply channels demanding fruit.

In the second of the two embodiments of the invention disclosed herein, the cyclic conveyor not only meters the round articles, but also arranges the travelling articles in longitudinal and lateral rows. The lateral rows of round articles may be perpendicular to the longitudinal rows and/or at an acute angle to the longitudinal rows. For this purpose the conveyor comprises closely spaced parallel longitudinal rows of rocking conveyor units, each of which rows of units carries a single longitudinal row of the round articles. Each of the conveyor units of a longitudinal row of conveyor units forms a longitudinal trough to centralize the round objects thereon and thus align the objects accurately in longitudinal rows. Preferably, the conveyor units are arranged both in transverse rows that are perpendicular to the longitudinal rows and in transverse rows that are diagonally of the longitudinal rows.

Basically, this second embodiment of the invention functions in the same manner as the first embodiment in that the round articles advance step by step, and if discharge from the conveyor is blocked, the articles merely reciprocate on the conveyor units instead of pressing forward. Articles do advance automatically, however, to fill any vacancies that may exist when the discharge from the conveyor is blocked.

Conceivably, the round objects may be so small in size relative to the size of a conveyor section in such a multiple-row conveyor that more than one article may be present on at least some of the conveyor units at a given time. In the preferred practice of the invention disclosed herein, however, there is room for only one round article on each conveyor unit to result in the fruit being arranged automatically and accurately in the desired perpendicular and oblique transverse rows.

A feature of the second embodiment of the invention is that since a single fruit is normally discharged from each longitudinal row on each cycle of the conveyor, the multiple-row conveyor inherently accurately meters the articles by discharging on each cycle as many articles as there are longitudinal rows. If all of the last conveyor units of the longitudinal rows of conveyor units are abreast of each other, each cycle of operation releases a transverse row that is perpendicular to the longitudinal rows. On the other hand, the last conveyor units of the longitudinal rows of conveyor units may be staggered to cause a diagonal row of the articles to be released on each cycle of the conveyor. In some instances the release of diagonal rows is desirable because of the somewhat greater spacing between the articles in the diagonal rows.

This capability of the second embodiment of the invention to release a transverse row of the round articles on each cycle may be utilized to convert a mass of articles at the intake end of the multiple-row conveyor into a continuous transverse row of travelling articles at the output end of the conveyor, the continuous travelling row being either at a right angle or at an acute angle to the longitudinal rows.

For example, the multiple-row conveyor may discharge onto a transverse conveyor that has a single row of travelling receptacles for the articles. With the multiple-row conveyor having a given number of longitudinal rows of conveyor units, the transverse conveyor may be synchronized with the multiple-row conveyor to cause the same given number of empty receptacles of the transverse conveyor to register with the longitudinal rows of the multiple row conveyor on each cycle of operation of the multiple-row conveyor.

The discharge of the articles from the multiple-row conveyor onto the single row conveyor may be interrupted whenever desired by simply de-energizing the multiple-row conveyor. A feature of the invention, however, is that closure control over the discharge of the round articles from the multiple-row conveyor is achieved by simply employing retractable gates at the ends of the longitudinal rows of conveyor units, the gates being operable in unison by remote control. This arrangement makes it possible to employ the gates to interrupt the conveyance of the articles by the multiple-row conveyor without the necessity of stopping the cycling of the multiple-row conveyor.

The features and advantages of the invention may be understood from the following detailed description together with the accompanying drawings.

BRIEF DESCRIPTION OF THE DRAWINGS

In the drawings, which are to be regarded as merely illustrative:

FIG. 2 is a longitudinal section along the line 2—2 of FIG. 1 showing an adjustable mechanism for actuating the conveyor units;

FIG. 3 is a fragmentary section on an enlarged scale taken along the line 3—3 of FIG. 1 showing means for supplying a mass of the rolling articles to the receiving end of the conveyor;

FIG. 4 is an enlarged fragmentary section along the angular line 4—4 of FIG. 1 showing further details of the adjustable actuating mechanism;

FIG. 5 is a fragmentary sectional view along the angular line 5—5 of FIG. 4 showing further details of the adjustable actuating mechanism;

FIG. 6 is a fragmentary section along the line 6—6 of FIG. 4 showing the part of the actuating mechanism that is adjustable to vary the range of rocking movement of the conveyor units;

FIG. 7 is a greatly enlarged fragmentary sectional view taken along the line 7—7 of FIG. 1 showing the discharge end of the conveyor with the conveyor units rocked to their forward limit positions;

FIG. 8 is a view similar to FIG. 7 showing the conveyor units rocked back to their rearward positions;

FIG. 9 is a plan view of a second embodiment of the invention;

FIG. 10 is an enlarged fragment of FIG. 9;

FIG. 11 is a section taken along the angular line 11—11 of FIG. 10 showing the conveyor units in transverse section;

FIG. 12 is a fragmentary longitudinal section along the line 12—12 of FIG. 10 showing the discharge end of one of the rows of conveyor units with the conveyor units rocked to their forward limit positions;

FIG. 13 is a view similar to FIG. 12 showing the conveyor units rocked back to their rearward limit positions;

FIG. 14 is an exploded perspective view showing one of the conveyor units together with a portion of a transverse support member on which the conveyor unit is mounted;

FIG. 15 is an enlarged fragmentary section taken along the line 15—15 of FIG. 9 showing how a diagonally positioned low-profile barrier may be employed to divert a supply of fruit onto the receiving end of the multiple-row conveyor; and FIG. 16 is a section taken along the angular line 16—16 of FIG. 9 showing the construction of retractable gates that may be employed to block discharge of the round articles from the multiple-row conveyor.

DESCRIPTION OF THE PREFERRED EMBODIMENT OF THE INVENTION

Figure 1:
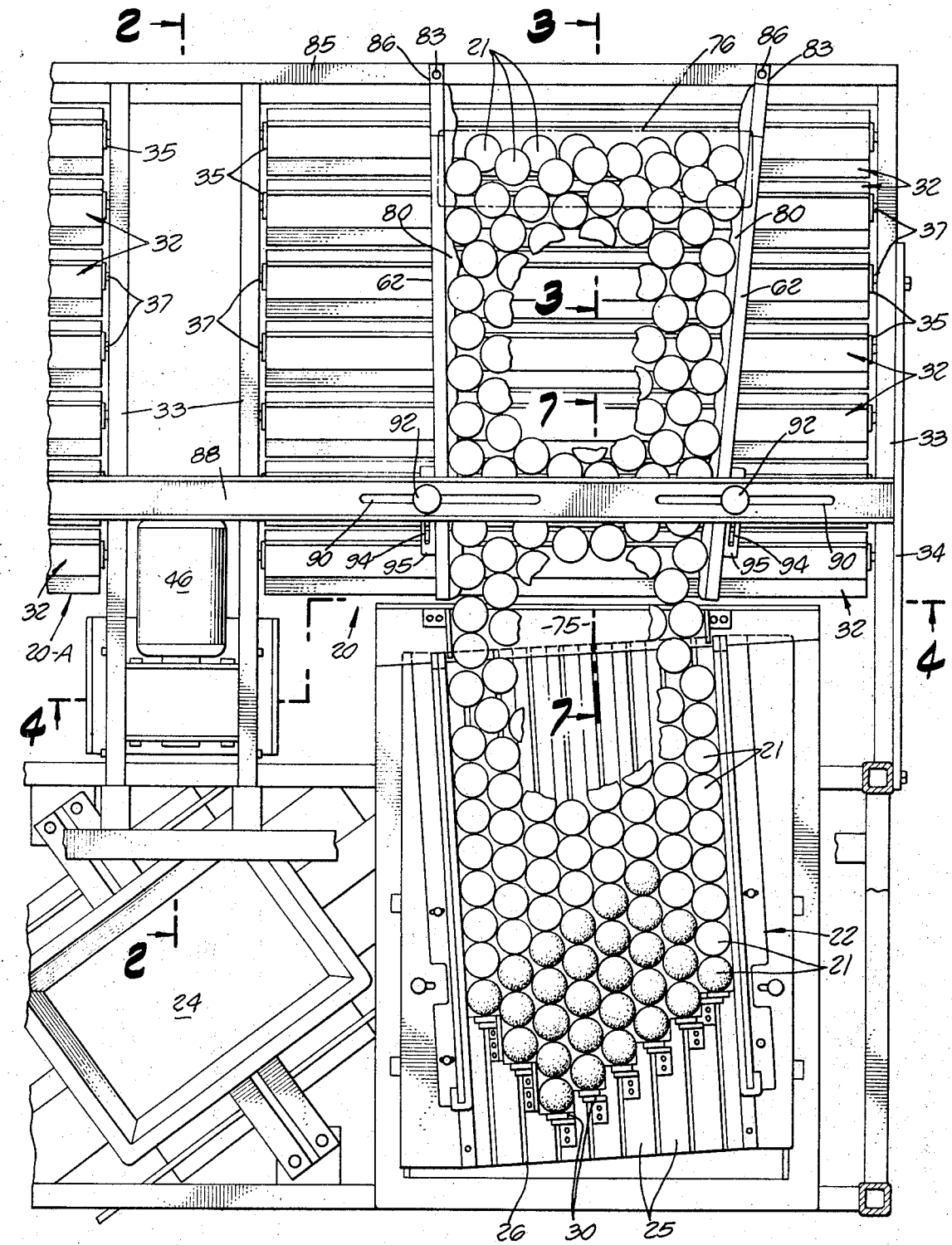
FIG. 1 is a plan view of the first embodiment of the invention as employed to continuously replenish parallel supply channels from which layers of fruit are packed into boxes for shipment.

Referring to the first embodiment of the invention shown in FIGS. 1–8, FIG. 1 shows how a cyclic conveyor 20 may be employed to replenish fruit 21 at a supply station, generally designated 22, of an apparatus for packing fruit in boxes at a packing station generally designated 24, such a packing apparatus is disclosed for example in U.S. Pat. No. 3,453,802 or in U. S. Pat. application Ser. No. 811,018, filed Mar. 27, 1969. The packing apparatus has two supply stations on opposite sides of the packing station 24, only one of the supply stations being shown in FIG. 1.

A second cyclic conveyor generally designated 20-A is paired with the cyclic conveyor 20 to keep the second supply station replenished with fruit. The packing apparatus lifts rectangular patterns of layers of the fruit from the two supply stations alternately, the fruit of one such rectangular layer being shaded in FIG. 1.

The supply station 22 has eight downwardly inclined channels to form eight rows of the fruit and each channel is formed by a pair of longitudinal rails 25 which are attached to the upper side of a rubber sheet 26.

As shown in section in FIG. 7, the rubber sheet 26 rests on a pair of superimposed metal plates 28 and the opposite longitudinal edges of the rubber sheet are attached to the two plates 28 respectively. Periodically, the two metal plates 28 are shifted laterally of each other slightly to cause the eight supply channels to widen temporarily to encourage the fruit to roll down the channels against barriers 30 at the ends of the channels. The barriers 30 are staggered as shown in FIG. 1 to form the rectangular pattern of fruit at the lower end of the supply station.

Each of the cyclic conveyors 20 and 20-A comprises a series of conveyor units 32 arranged edge to edge and both of the conveyors are mounted on a common frame structure that includes four longitudinal channel irons 33, two on the two opposite sides respectively of each conveyor. The common frame structure of the two conveyors is releasably connected to the frame structure of the two corresponding supply stations 22 by a pair of side bars 34 (FIGS. 1 and 4).

Each of the conveyor units 32 comprises simply a suitably shaped board that is pivotally mounted at its opposite ends on the two corresponding channel irons 33 in a manner that is shown in FIG. 4. In FIG. 4 an angle iron bracket 35 at each end of a conveyor unit 32 extends under the conveyor unit and is secured thereto by screws 36. Each end of the conveyor unit 32 is journalled on a corresponding spindle 37 that extends through a bore in the corresponding angle iron bracket 35. Each spindle has a screw threaded shank 38 that extends through the corresponding frame channel 33 and through a longitudinal reinforcing bar 39 that is welded to the channel, the shank being provided with a suitable lock nut 40.

On one end of each of the conveyor units 32 a downwardly extending angle iron bracket is anchored back to back to the corresponding angle iron bracket 35 to form a downwardly extending actuating arm 42 for the conveyor unit. The actuating arms 42 of each of the two cyclic conveyors 20 and 20-A are connected by pivots 44 to a corresponding push-pull bar 45 by means of which the conveyor units 32 of each conveyor are rocked in synchronism.

FIGS. 2 and 4 show how a motor 46 may drive a pair of cranks 48 to actuate the two push-pull arms 45 respectively of the two cyclic conveyors 20 and 20-A, each crank being connected to the corresponding push-pull arm by a link 50. The motor 46 actuates a short transverse drive shaft 52 (FIG. 4) by reduction gearing in a gear box 54 and the two cranks 48 are adjustably mounted on the opposite ends of the drive shaft. Referring to FIGS. 4, 5, and 6, each crank 48 is fixedly mounted on a corresponding small triangular plate 55 and each triangular plate is pivotally mounted on the corresponding end of the drive shaft 52 by a screw 56. Each of the triangular plates 55 is adjustably fixed relative to the corresponding end of the drive shaft 52 by a screw 58 which extends through an arcuate slot 60 of the triangular plate.

As may be seen in FIG. 1, the width of each conveyor unit 32 is many times the diameter of the round articles thereon and the effective width of the conveyor as a whole is determined by a pair of side boards 62 which match the width of the receiving end of the supply station 22.

As shown in section in FIG. 7, each of the conveyor units 32 has a transverse ridge 64 adjacent its rear edge which prevents the round articles from rolling off the rear edge of the conveyor unit and which defines the rear portion of a seat 65 of the conveyor unit that receives the successive round articles. The upper surface of the conveyor unit is divided into a rearward portion 66 which includes the seat 65 and a forward portion 68 which inclines downwardly from the rearward portion, there being a crest 70 at the juncture of the two portions of the surface. It is to be noted that the rearward portion 66 of the surface of a conveyor unit is inclined forwardly upward when the conveyor unit is in its rearward position shown in FIG. 8, but inclines forwardly downward when the conveyor unit is in its forward position shown in FIG. 7. The forward portion 68 of the surface of the conveyor unit, however, is inclined forwardly downward throughout the whole range of rocking movement of the conveyor unit.

It is also apparent in FIG. 7 that when the conveyor units are at their forward limit positions the forward portions 68 of the conveyor surfaces cooperate with the back faces 72 of adjacent conveyor units to form temporary V-shaped spaces or cradles, designated C, in which the round articles come to rest when the conveyor units swing to their forward positions. In the same manner, the forward portion 68 of the conveyor unit 32 at the discharge end of the conveyor cooperates with the back face 74 of the threshold 75 of the supply station 22 to form such a temporary cradle C for the round objects. FIG. 7 shows two round objects 21A seated in the cradles formed by successive conveyor units and shows a third round object 21B in the cradle that is formed between the last conveyor unit and the threshold 75.

It is important to note that the various cradles C are so formed and dimensioned that the center of gravity of a fruit therein is forward of the forward edge of the conveyor unit behind the fruit. Consequently, the forward edge of the conveyor unit can boost the fruit in the cradle only in the forward direction.

Normally, when all of the conveyor units 32 are rocked to their forward limit positions, new articles roll onto the seats 65 of the conveyor units as shown in FIG. 8. When the conveyor units rock to their forward limit positions the newly received articles roll forward into the cradles C as shown in FIG. 7, and when the conveoyr units again rock to their rearward positions, the round articles in the cradles are boosted from the cradles into seats 65 of the conveyor units or onto the threshold 75 of the supply station. Thus, as each conveyor unit 32 reaches its rearward limit position shown in FIG. 8, a round article on the forward end of the conveyor unit is boosted forwardly and almost at the same time a new article rolls onto the seat 65 of the conveyor unit.

As shown in FIG. 2, when the apparatus is used in cooperation with a fruit packing machine, the fruit to be packed may be supplied to the cyclic conveyor by a spout or chute 76 from a supply hopper 78 with the previously mentioned pair of side boards 62 confining the fruit to a wide path that registers with the receiving end of the supply station 22. As indicated in FIGS. 1, 3, 4, 7, and 8, each of the two side boards 62 is provided at its lower edge with a flexible rubber skirt 80 that serves as a yielding barrier to keep relatively small fruit from rolling under the lower edges of the two side boards. As indicated in FIG. 4, the sheets that form the resiliently flexible skirts 80 may extend upwardly to form liners 82 for the inner surfaces of the two side boards 62.

Since different supply stations 22 may be used interchangeably in a packing apparatus for packing fruit of different sizes in boxes of different sizes, the two side boards 62 of the conveyor are adjustable to conform to the width of different supply stations. For this purpose, as shown in FIG. 3, a metal strap 83 is attached by screws 84 to the lower edge of each side board 62 at the receiving end of the side board and the strap is connected to a fixed transverse frame member 85 by a pivot bolt 86. Thus, the two side boards may be pivotally adjusted to converge to different degrees at the thresholds 75 of different supply stations.

To releasably anchor the side boards 62 at their adjusted positions, a bridge 88 across the two conveyors 20 and 20-A is formed with a slot 90 in the region of each of the side boards 62 and a manually operable screw with a knob 92 extends through each of the slots into a corresponding longitudinal slot 94 in an angle iron bracket 95 on the corresponding side board. The knobs 92 may be rotated manually to loosen the screws for the purpose of changing the adjustment of the two side boards.

Turning now to the second embodiment of the invention shown in FIGS. 9–16, FIG. 9 shows in plan view a multiple-row conveyor, generally designated 100, comprising individual conveyor units 102 arranged in seven longitudinal rows and also arranged in transverse rows, there being both transverse rows that are perpendicular to the longitudinal rows and transverse rows that are diagonally of the longitudinal rows. It is to be noted that the final conveyor unit of the seven rows from which the fruit is ultimately discharged are staggered to define one of the diagonal rows, but it is to be understood that, if desired, the final conveyor units may be abreast of each other to define a transverse row that is perpendicular to the longitudinal rows.

The fixed frame structure of the multiple-row conveyor 100 includes a relatively long side frame member 104 in the form of an angle iron and a shorter opposite side frame member 105 which is also an angle iron. These two side frame members are interconnected across the discharge end of the conveyor by an end frame member 106 of zigzag configuration in plan.

All of the conveyor units rock between rearward positions and forward positions synchronously to function in the same basic manner as the conveyor units of the first embodiment of the invention.

Each of the conveyor units 102 is preferably in the form of a hollow molded plastic member of the configuration shown in FIGS. 12–14. Each of the conveyor units has a back wall 108, two opposite side walls 110, and a top wall along which the round articles roll. The top wall of each conveyor unit forms a transverse ridge 112 adjacent the rear edge of the conveyor unit, which ridge has the same function as the corresponding ridges of the conveyor units of the first embodiment of the invention.

The upper surface of each of the conveyor units is of S-shaped curvature in cross section, being divided into a rearward concave portion 114 that includes the ridge 112 to form the conveyor seat and a forward convex portion 115. Thus, here again the forward portion of the upper surface of the conveyor unit is inclined downward, there being a crest between the two portions. As may be seen in perspective in FIG. 14 and in cross section in FIG. 11, each of the conveyor units 102 forms a longitudinal trough 116, the trough serving to align the fruit accurately in longitudinal rows. In the preferred practice of the invention illustrated herein, only a single fruit is discharged from the end of the longitudinal rows of units on each cycle of the conveyor and the conveyor units are small enough relative to the diameter of the fruit to carry out this intention.

As shown in FIG. 10, the single conveyor unit 102-A at the end of the longest longitudinal row of conveyor units is journalled by two trunions 118 in the side frame member 104 and the zigzag end frame member 106 respectively. In like manner the conveyor units of each transverse row that is perpendicular to the longitudinal rows are carried by a single support structure which is journalled at its opposite ends.

In FIGS. 10 and 11, for example, where the perpendicular transverse row comprises only two conveyor units 102-B, the two hollow plastic conveyor units are mounted on a transverse angle iron 120, the two side walls 110 of each conveyor unit being formed with an angle iron notch 122, as shown in FIG. 14, to conform to the cross sectional configuration of the angle iron. At each end of the angle iron 120 an upwardly extending angular bracket 124 is secured by suitable bolts 125 and carries the corresponding trunion 118.

Adjacent the longer side frame member 104, angular brackets 126 (FIGS. 11 and 12) extend downward from each of the transverse angle irons 120 to serve as an actuating arm for rocking the angle iron as required to cause the conveyor units 102 to rock in unison between their rearward and forward positions. As shown in FIG. 12, each of the brackets 126 is operatively connected by a corresponding pivot 128 to a longitudinal push-pull bar 130 which is reciprocated longitudinally by means of an adjustable link 132.

As shown in FIG. 9, the adjustable link 132 is connected to one arm of a bell crank 134 and the second arm of the bell crank is connected to one arm of a second bell crank 135 by means of a relatively long transverse link 136. The second arm of the bell crank 135 is connected by a link 138 to a crank 140 on a disk 142 that is actuated by gearing in a gear box 144. It is apparent that this arrangement causes all of the conveyor units 102 to swing forward and backward in unison to discharge one diagonally transverse row of the fruit on each cycle of operation of the multiple-row conveyor.

FIG. 12 shows how conveyor units 102 of one of the longitudinal rows of conveyor units swing to their forward positions to cause fruit on the conveyor units to roll into cradles C as heretofore described. Thus, in FIG. 12 there are two cradles C each of which is formed in part by a back wall 108 of a conveyor unit and there is a final cradle C which is formed in part by a transverse portion of the previously mentioned zigzag end frame member 106.

When the conveyor units 102 of the longitudinal rows rock to their rearward position shown in FIG. 13, each fruit that is in one of the cradles is advanced forward either onto the seat of the next forward conveyor or over the final barrier 106 for discharge from the conveyor. It is apparent, then, that normally each of the conveyor units 102 receives a fruit when it reaches its rearward position and that the fruit rolls forward into a cradle when the conveyor unit reaches its forward position, the fruit being advanced from the forward end of the conveyor unit as the conveyor unit returns to its rearward position.

In the arrangement shown in FIG. 9, fruit from a suitable supply source moves in the direction of the arrow 148 along a main supply channel 150 that has opposite side walls 152. The supply channel 150 has a branch channel 154 at approximately 45° which slopes downward to cause the fruit to gravitate to the input end of the multiple-row conveyor 100.

Fruit that does not gravitate onto the branch channel 154 encounters a low profile barrier 155 that is also positioned at about 45° from the direction of the arrow 148. As shown in section in FIG. 15, the low profile barrier 155 may comprise a length of rope bonded to the surface of the supply channel 150. If the fruit crowds against the barrier 155 sufficiently to form more than one layer, some of the fruit continues over the barrier, and the fruit that continues may either be recycled or may be delivered to another multiple-row conveyor. The fruit that gravitates down the slope of the branch channel 154 encounters tapered baffles 156 that divided the fruit into longitudinal rows corresponding to the seven rows of conveyor units 102 of the multiple-row conveyor.

FIG. 9 further illustrates the manner in which the multiple-row conveyor 106 may discharge the successive diagonal rows of fruit onto a single row conveyor that is generally designated 158. The single row conveyor has a row of receptacles 160 that are spaced apart in accord with the spacing of the fruit in a diagonal row that is discharged from the multiple-row conveyor. The receptacles 160 are attached at their opposite sides to two corresponding sprocket chains 162 that ride on the upturned flanges of corresponding angle irons 164. The two sprocket chains 162 are driven in unison by corresponding sprockets 165 on a transverse drive shaft that is driven by a motor 166.

At the outer end of the single row conveyor 158, a pair of sprockets 168 are driven by the two sprocket chains 162, the two sprockets being mounted on a transverse drive shaft 170. The driven shaft 170 is connected at one end to the gearing in the previously mentioned gear box 144 which serves to cycle the conveyor units 102 in the desired synchronism with the operation of the single row conveyor. Thus, the single row conveyor advances seven empty receptacles 160 into registry with the seven rows of the multiple-row conveyor on each cycle of operation of the multiple-row conveyor.

The structure shown in FIG. 9 includes retractable gates or stops 175 which may be omitted, the gates being at the ends of the longitudinal rows of conveyor units 102 and being operable simultaneously. FIG. 16 shows how each gate 175 is movable between a blocking position shown in solid lines and a retracted position shown in dotted lines. In its blocking position each of the gates 175 blocks discharge of fruit from a corresponding longitudinal row of the conveyor units, the gate being effective to prevent the last fruit in the row from being boosted over the corresponding barrier 106 that is part of the last cradle of the row. In a manner heretofore described with reference to the first embodiment of the invention, blocking the discharge of fruit from the end of a row of the conveyor units 102 has the effect of stopping the conveyance of fruit by the row of conveyor units except for the fact that fruit does advance to fill any vacancy that may exist in the row.

Referring to FIGS. 9 amd 16, each of the gates 175 is in the form of a finger on a rocker shaft 176 that is rotatably suported at its opposite ends by brackets 178 and 180. One end of the rocker shaft 176 carries an actuating arm 182 that is pivotally connected to the armature 184 of a solenoid 185, the solenoid being mounted by a pivot 186 on a suitable bracket 188. A coil spring 190 acting under compression between the body of the solenoid 185 and a collar 192 on the armature 184 urges the armature to the advanced position shown in FIG. 16 which holds the gates at their effective blocking positions shown in solid lines. The collar 192 carries an upright pin 194 which may be engaged by the notch 195 of a pivoted latch arm 196 to hold all of the gates in their retracted positions in opposition to the pressure of the spring 190.

The gates 175 may be employed to precisely time the release of fruit simultaneously from the seven rows of conveyor units. For this purpose the circuit for energizing the solenoid 185 may be provided with a normally open switch 198 which is periodically closed by a radial lug 200 on a disc 202 that is actuated by gearing in a gear box 204. The gearing in the gear box 204 is operated by one end of the previously mentioned transverse shaft 142 that is actuated by two sprockets of the single row conveyor 158. Thus, the two gear boxes 144 and 204 serve the purpose of synchronizing the operation of the single row conveyor 158 and the operation of the gates 175 with the cycles of operation of the multiple-row conveyor 100.

Preferably, the circuit for energizing the solenoid 185 includes a second switch 205 that is normally closed and may be opened to keep solenoid 185 from being energized when the latch arm 196 holds the gates retracted.

The foregoing description in specific detail of the two selected embodiments of the invention will suggest various changes, substitutions, and other departure from the disclosure within the spirit and scope of the appended claims.

I claim:

1. Means to convey articles of generally round configuration in a given general direction, comprising:
   a series of conveyor units arranged edge to edge in said direction, each having a transverse ridge adjacent its back edge to prevent articles from rolling off the back edge and an upper article-supporting surface extending forwardly therefrom;
   each of said conveyor units being mounted for rocking about an axis that extends transversely of said direction; and
   actuating means interconnecting all of said conveyor units for rocking all of said ceonvyor units simultaneously in the same direction on their axes between rearwardly tilted article-receiving positions and forwardly tilted positions wherein said upper surfaces slope forwardly and downwardly and in which articles thereon are moved by gravity to article delivery positions adjacent the rear edge of the next forward conveyor units, and said conveyor units upon being simultaneously rocked again into rearwardly tilted positions coacting to cause the articles to roll forwardly from the article delivery positions to the article receiving positions of the next forward conveyor units.

2. A combination as set forth in claim 1 in which each of said transverse axes is spaced below the upper conveying surface of the corresponding conveyor unit.

3. A combination as set forth in claim 1 in which the forward portion of the upper surface of each of the conveyor units slopes downwardly relative to the rearward portion of the upper surface to cooperate with the rear end of the next forward conveyor unit to form an article-receiving cradle when both conveyor units are at their forwardly tilted positions.

4. A combination as set forth in claim 1 in which the conveyor units are so shaped and dimensioned and the rate of which the actuating means rocks the conveyor units is such that rearward rocking of a conveyor unit is initiated while an article is rolling forward thereon so that the degree of downward inclination of the surface on which an article rolls progressively decreases as the article approaches the forward edge of the conveyor unit.

5. A combination as set forth in claim 4 in which the conveying surface of each conveyor unit is divided into a rearward portion and a forward portion with the forward portion sloping downward relative to the rearward portion;

in which the rearward portion of the surface swings from the forwardly tilted position to a rearwardly tilted position in the course of the rearward rocking movement;

and in which the actuating means rocks said conveyor units at a rate such that an article on a conveyor unit rolls along the first portion of the surface while the conveyor unit is rocking rearwardly, but passes onto the second portion of the surface before the first portion tilts rearwardly.

6. A combination as set forth in claim 5 in which the angle between the two portions of the surface and the rocking movement of the conveyor are such that the forward portion of the surface is tilted forwardly throughout the range of rocking movement of a conveyor unit.

7. Means to convey articles of generally round configuration by rolling action in a given direction, comprising:

a series of conveyor units arranged edge to edge in a row extending in said direction, the upper surface of each of the conveyor units defining a seat adjacent the back edge of the unit to receive articles from the region back of the unit and extending forwardly therefrom, each of the conveyor units being rockable about an axis extending transversely of said direction; and actuating means interconnecting all said conveyor units for rocking all the conveyor units cyclically in synchronism about their axes with all of the units simultaneously rocking from rearwardly tilted article-receiving positions to forwardly tilted positions, wherein said upper surfaces slope forwardly and downwardly and vice versa to cause the received articles to roll forwardly on the units and adjacent the rear edge of the next forward units, whereby normally the articles advance by one conveyor unit in each cycle of said actuating means.

8. A combination as set forth in claim 7 which includes means movable from a retracted position to a position effective to block the discharge of articles from the last conveyor unit of the series thereby to stop the conveyance of the articles by the series even though said actuating means continues to rock the conveyor units.

9. A combination as set forth in claim 7 in which the width of each of said conveyor units measured transversely of said direction is sufficient to accommodate a plurality of the articles.

10. A combination as set forth in claim 9 in which the forward end of the series discharges onto the intake end of a set of longitudinal channels that are positioned side by side to form the articles into longitudinal rows from which various numbers of the articles are dispensed periodically, whereby the series of conveyor units supply the articles to the different channels in accord with the number of articles that are dispensed from the different channels.

11. A combination as set forth in claim 9 in which the means to supply the articles to the input end of the series of conveyor units supplies the articles in a mass that is more than one layer in depth;

and in which there are a sufficient number of the conveyor units in the series to reduce the travelling mass to a single layer before the articles reach the discharge end of the series, whereby the series of conveyor units by virtue of its cyclic operation functions to meter the rate at which the articles are delivered to the discharge end of the series.

12. A combination as set forth in claim 9 which includes a pair of longitudinal panels extending generally in said given direction across the series of conveyor units and spaced apart by multiple times the width of the articles, to confine a mass of articles on the series of conveyor units to a given wide path.

13. A combination as set forth in claim 12 in which the lower portions of said panels are provided with flexible skirts that extend into the range of up and down movement of the conveyor units and are yieldable to the rocking movements of the conveyor units.

14. A combination as set forth in claim 7 in which the upper surface of each of the conveyor units forms a longitudinal trough along which the articles roll from the back edge to the front edge of the conveyor unit.

15. A combination as set forth in claim 14 in which the bottom of said trough as seen in longitudinal section is of S-shaped curvature, being of concave curvature in the rear half of the trough to form said seat for the articles and being of convex configuration in the forward half of the trough.

16. Means to receive a mass of articles of generally round cross section from a supply means and to convey the articles by rolling action from the supply means and to form the moving articles into parallel rows extending in a given longitudinal direction, comprising:

an assembly of a plurality of parallel longitudinal rows of conveyor units, each conveyor unit having an upper support surface forming a longitudinal trough for the articles with the trough forming a seat adjacent the back edge of the conveyor unit to receive an article from the region back of the conveyor unit;

actuating means to rock the conveyor units of each row in unison simultaneously from rearwardly tilted article-receiving positions to forwardly tilted positions and vice versa to cause each conveyor unit as it approaches its forwardly tilted position to roll an article thereon forwardly against the elevated back edge of the next forward conveyor unit and as the conveyor unit returns from its forwardly tilted position to act on the article that is adjacent said back edge of the next forward unit to transfer the article to the next forward conveyor unit, whereby the row of articles on each row of the conveyor units is advanced step by step in said longitudinal direction by the rocking of the conveyor units as long as discharge of articles from the last unit of the row is not blocked.

17. A combination as set forth in claim 16 in which said actuating means rocks the conveyor units of all of the longitudinal rows in unison.

18. A combination as set forth in claim 16 in which the conveyor units are arranged not only in longitudinal rows but also in transverse rows extending laterally of said given direction.

19. A combination as set forth in claim 18 in which the lateral rows include rows that are perpendicular to the longitudinal rows.

20. A combination as set forth in claim 19 in which the lateral rows include rows at acute angles to the longitudinal rows.

21. A combination as set forth in claim 18 in which said transverse rows include both rows that are perpendicular to the longitudinal rows and rows that are at acute angles to the longitudinal rows.

22. A combination as set forth in claim 18 in which the conveyor units at the discharge ends of the parallel longitudinal rows are arranged to define one of said transverse rows whereby each cycle of operation of the actuating means discharges a transverse row of the articles from the discharge end of the assembly.

23. A combination as set forth in claim 22 in which the discharge ends of the longitudinal rows are staggered so that the last conveyor units of the longitudinal rows form a transverse row that is at an acute angle to the longitudinal rows.

24. A combination as set forth in claim 22 which includes a single-row conveyor parallel to said one fo said transverse rows extending transversely of the discharge end of said assembly to receive successive transverse rows of the articles from the assembly.

25. A combination as set forth in claim 24 in which said supply means includes means to supply the mass of articles in an initial direction at an acute angle to said given direction,
and in which the supply means includes means to divert the mass of articles from said initial direction to said given direction,
whereby the angle of said single row conveyor relative to the initial direction is the sum of said acute angle and the angle of said transverse rows relative to the given direction.

26. A combination as set forth in claim 25
in which the discharge ends of the longitudinal rows are staggered so that the last conveyor units of the longitudinal rows form a transverse row that is at an acute angle relative to said given direction,
whereby the angle of said single row relative to the initial direction is the sum of said acute angles.

27. A combination as set forth in claim 25 in which said sum is substantially 90°.

28. A combination as set forth in claim 24 in which said single row conveyor has a single row of travelling receptacles to receive successive transverse rows from the assembly and in which the single row conveyor is synchronized with said assembly to provide a row of empty receptacles to receive a transverse row from the assembly on each cycle of operation of the assembly.

29. A combination as set forth in claim 24 in which there are a given number of longitudinal rows of conveyor units in said assembly;
and in which the advance of said single row conveyor is correlated with the frequency of the cycles of the actuating means to advance said given number of empty receptacles to the discharge end of the assembly on each cycle of the actuating means.

30. A combination as set forth in claim 24 in which the single row conveyor operates continuously and in which the rate of travel of the conveyor is set for said given number of receptacles to pass the discharge end of the assembly on each cycle of said actuating means.

31. A combination as set forth in claim 16 which includes blocking means at the discharge end of said assembly that is movable between a retracted position and a blocking position to block discharge of articles from the discharge end of the assembly.

32. A combination as set forth in claim 31
which includes a single row conveyor extending transversely of the discharge end of the assembly to receive successive transverse rows of the articles from the assembly;
and in which said blocking means is operative to release articles from all of the longitudinal rows simultaneously;
and in which the blocking means is operated periodically in timed relation to the operation of the single row conveyor.

33. A combination as set forth in claim 32 which includes electro-magnetic means to operate said blocking means and which includes switch means to operate said electro-magnetic means in response to operation of the single row conveyor.

34. A combination as set forth in claim 33 in which the blocking means is biased to its blocking position and is opened by energization of the electro-magnetic means.

35. A combination as set forth in claim 33 which includes latch means operable to hold the blocking means in its retracted position whenever desired.

36. A combination as set forth in claim 35 which includes switch means operable when the blocking means is latched to keep said electro-magnetic means de-energized while the latch means is effective.

37. A combination as set forth in claim 16 which includes longitudinally positioned divider baffles at the input end of the assembly to form the articles into longitudinal rows corresponding to the longitudinal rows of conveyor units as the articles approach the input end of the assembly.

38. Means to convey articles of generally round configuration by rolling action in a given direction, comprising:
a series of conveyor units arranged edge to edge in a row extending in said direction,
the upper surface of each of the conveyor units defining a seat adjacent the back edge of the unit and extending forwardly therefrom to receive articles from the region back of the unit,
each of the conveyor units being rockable about an axis extending transversely of said direction; and
actuating means interconnecting all of said conveyor units for rocking the conveyor units simultaneously in synchronism about their axes between rearwardly tilted article-receiving positions and forwardly tilted positions in which said upper surfaces slope forwardly and downwardly whereby the received articles thereon roll forwardly on the units, whereby normally the articles advance by one conveyor unit in each cycle of said actuating means,
the said upper surface of each conveyor unit being divided into a rear portion that includes the seat of the conveyor unit and a forward portion, said forward portion being inclined downwardly relative to the rear portion of the surface whereby when a pair of successive conveyor units reach their forwardly inclined positions, the forward portion of the surface of the rearward conveyor unit of the pair cooperates with the back edge of the forward conveyor unit of the pair to form a cradle to receive an article that rolls forward on the rearward conveyor unit and as the pair of conveyor units return to their rearwardly tilted positions, the downwardly inclined forward portion of the rearward conveyor unit of the pair lifts an article from the cradle onto the seat of the forward conveyor unit of the pair.

39. A combination as set forth in claim 38, which said forward portion of the surface of each conveyor unit is at such an angle relative to the rearward portion that the forward portion is tilted forward from the horizontal when the conveyor unit is in its rearwardly tilted position.

40. A combination as set forth in claim 38 in which the rate at which the actuating means rocks each conveyor unit between its two opposite positions is sufficiently high for a conveyor unit to start its return movement from its forwardly tilted position while an article is still moving forward on the unit to decrease the forward component of gravitational force on the article as the article approaches the cradle at the front edge of the conveyor.

* * * * *